(12) United States Patent
Niwa

(10) Patent No.: US 10,093,212 B2
(45) Date of Patent: Oct. 9, 2018

(54) VEHICLE SEAT

(71) Applicant: TOYOTA BOSHOKU KABUSHIKI KAISHA, Aichi-ken (JP)

(72) Inventor: Masayuki Niwa, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 7 days.

(21) Appl. No.: 15/254,660

(22) Filed: Sep. 1, 2016

(65) Prior Publication Data
US 2017/0066356 A1 Mar. 9, 2017

(30) Foreign Application Priority Data

Sep. 7, 2015 (JP) ................................. 2015-175333

(51) Int. Cl.
*B60N 2/58* (2006.01)
*B60N 2/68* (2006.01)
*B60N 2/70* (2006.01)
*B60N 2/72* (2006.01)

(52) U.S. Cl.
CPC .......... *B60N 2/7094* (2013.01); *B60N 2/5825* (2013.01); *B60N 2/68* (2013.01); *B60N 2/72* (2013.01)

(58) Field of Classification Search
CPC ...... B60N 2/5825; B60N 2/68; B60N 2/7094; B60N 2/72
USPC ......................................... 297/218.3, 452.52
See application file for complete search history.

(56) References Cited

U.S. PATENT DOCUMENTS

| 9,561,741 | B2* | 2/2017 | Nagayasu | ................ B60N 2/14 |
| 9,597,987 | B2* | 3/2017 | Ushiyama | ............ B60N 2/6009 |
| 2007/0257531 | A1 | 11/2007 | Mashimo | |
| 2015/0108806 | A1* | 4/2015 | Nagayasu | ............ B60N 2/7094 297/337 |
| 2015/0307004 | A1* | 10/2015 | Ushiyama | ............ B60N 2/6009 297/452.18 |

(Continued)

FOREIGN PATENT DOCUMENTS

| CN | 1847050 | 10/2006 |
| CN | 102910098 | 2/2013 |

(Continued)

OTHER PUBLICATIONS

Chinese Office Action for CN App. No. 201610801271.6 dated Apr. 27, 2018, along with English-language translation thereof.

*Primary Examiner* — Ryan D Kwiecinski
(74) *Attorney, Agent, or Firm* — Greenblum & Bernstein, P.L.C.

(57) ABSTRACT

A vehicle seat includes a seat frame; a seat pad; a seat cover; and a support member. An end of the support member is hooked over a receiving portion provided within the seat frame with the support member being disposed within the seat frame. A first portion supported by the support member and a second portion that is not supported by the support member are formed in the seat pad on the seat frame, and a reverse side of the vehicle seat at the second portion is covered with the seat cover extending from a seating side of the seat pad around to the reverse side of the seat pad. A distal portion of the seat cover is retained by a retaining portion provided on a second portion-side end of the support member, the distal portion covering the reverse side of the vehicle seat at the second portion.

4 Claims, 7 Drawing Sheets

(56) References Cited

U.S. PATENT DOCUMENTS

2017/0028894 A1* 2/2017 Niwa .................. B60N 2/7094

FOREIGN PATENT DOCUMENTS

| CN | 203601071 | | 5/2014 | | |
|----|-----------|---|--------|---|---|
| CN | 104999947 | | 10/2015 | | |
| FR | 3018234 | B1 * | 3/2016 | ........... | B60N 2/5825 |
| JP | 2015-66222 | | 4/2015 | | |
| JP | 2017030494 | A * | 2/2017 | ........... | B60N 2/7094 |

* cited by examiner

VEHICLE SEAT

INCORPORATION BY REFERENCE

The disclosure of Japanese Patent Application No. 2015-175333 filed on Sep. 7, 2015 including the specification, drawings and absent is incorporated herein by reference in its entirety.

BACKGROUND OF THE INVENTION

1. Field of the Invention

The invention relates to a vehicle seat that includes a seat pad that is disposed on a seat frame, and a seat cover that covers a part from a seating side of the seat pad to a reverse side of the seat.

2. Description of Related Art

As a vehicle seat of this kind, a vehicle seat that includes a seat frame that forms a seat framework, a seat pad that forms an external shape of the seat, and a seat cover that covers the seat pad is known (refer to Japanese Patent Application Publication No. 2015-66222 (JP 2015-66222 A)). In this vehicle seat, a seat cushion includes the seat pad, which is made of a foamed resin, and a front part of the seat pad is supported by a flat plate-shaped front panel that forms the seat frame. The front panel has substantially L-shaped engaging portions, which are formed by cutting and bending parts of the front panel, and the engaging portions protrude downward from a reverse side of the front panel. The seat cover includes a part that can cover a seating side of the seat pad and a pocket portion that is provided at a front part of the seat cover. The pocket portion is a bag-shaped portion into which a front part of the seat pad can be inserted together with the front panel, and has holes engageable with the engaging portions at a reverse side thereof. In the known art, the seating side of the seat pad is covered with the seat cover with a front part side of the seat pad being disposed on the front panel. At this time, a front part of the seat pad is inserted into the pocket portion of the seat cover together with the front panel and the engaging portions of the front panel are engaged with the holes of the pocket portion. In this way, a seat configuration with a good appearance can be achieved by covering the front part of the seat pad and the reverse side of the front panel with the pocket portion.

SUMMARY OF THE INVENTION

In the known art, a reverse side of the pocket portion is engaged with the engaging portions that are provided on an intermediate portion of the front panel. However, a distal portion of the pocket portion beyond the engaging portions is not engaged with any of the other members, such as the seat frame, and is therefore in a somewhat unstable state.

The invention provides a vehicle seat in which a distal portion of a seat cover that covers a reverse side of the vehicle seat is stably retained.

An aspect of the invention relates to a vehicle seat including a seat frame that forms a framework of the vehicle seat; a seat pad that forms an external shape of the vehicle seat and elastically supports an occupant; a seat cover that covers the seat pad; and a linear or planar support member that supports the seat pad from a reverse side of the seat pad. An end of the support member is hooked over a receiving portion that is provided within the seat frame with the support member being disposed within the seat frame. A first portion that is supported by the support member and a second portion that is not supported by the support member are formed in the seat pad disposed on the seat frame, and a reverse side of the vehicle seat at the second portion is covered with the seat cover that extends from a seating side of the seat pad around to the reverse side of the seat pad. In this configuration, it is desirable that a distal portion of the seat cover that covers the reverse side of the vehicle seat should be stably retained.

Thus, in the above aspect of the invention, a distal portion of the seat cover is retained by a retaining portion that is provided on a second portion-side end of the support member, the distal portion covering the reverse side of the vehicle seat at the second portion. In the above configuration, the support member that is provided on the reverse side of the seat pad can be used to retain the distal portion of the seat cover stably while the reverse side of the vehicle seat at the second portion is covered with the seat cover. In the above configuration, the distal portion of the seat cover that covers the reverse side of the vehicle seat can be stably retained.

In the above aspect of the invention, the retaining portion may be able to move relative to the second portion-side end of the support member in a direction away from the second portion-side end, by using a force for pulling the distal portion of the seat cover toward the seating side. In the above configuration, for example, when the seat cover is excessively pulled, relative movement of the retaining portion can absorb the tension on the seat cover and appropriately prevent an excessive tension from being applied to the support member. The above configuration enables the distal portion of the seat cover to be retained stably and effectively.

In the above aspect of the invention, the retaining portion may extend from the second portion-side end of the support member and protrude toward a side where the second portion is positioned. In the above configuration, because the retaining portion protrudes from the second portion-side end of the support member, the second portion-side end of the support member hardly causes interference with the distal portion of the seat cover when the distal portion is attached to and retained by the retaining portion. The above configuration enables the distal portion of the seat cover to be retained stably and effectively.

In the above aspect of the invention, the support member may include a face material or a wire rod that is made of a metal and that is able to support the seat pad, and a covering portion that is made of a resin and covers at least a part of the face material or the wire rod; and the retaining portion may be formed of only the covering portion. In the above configuration, the retaining portion is formed of the covering portion that is made of a resin, it is possible to minimize the possibility that the distal portion of the seat cover is damaged due to contact with the retaining portion. The above configuration enables the distal portion of the seat cover to be retained stably and effectively.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
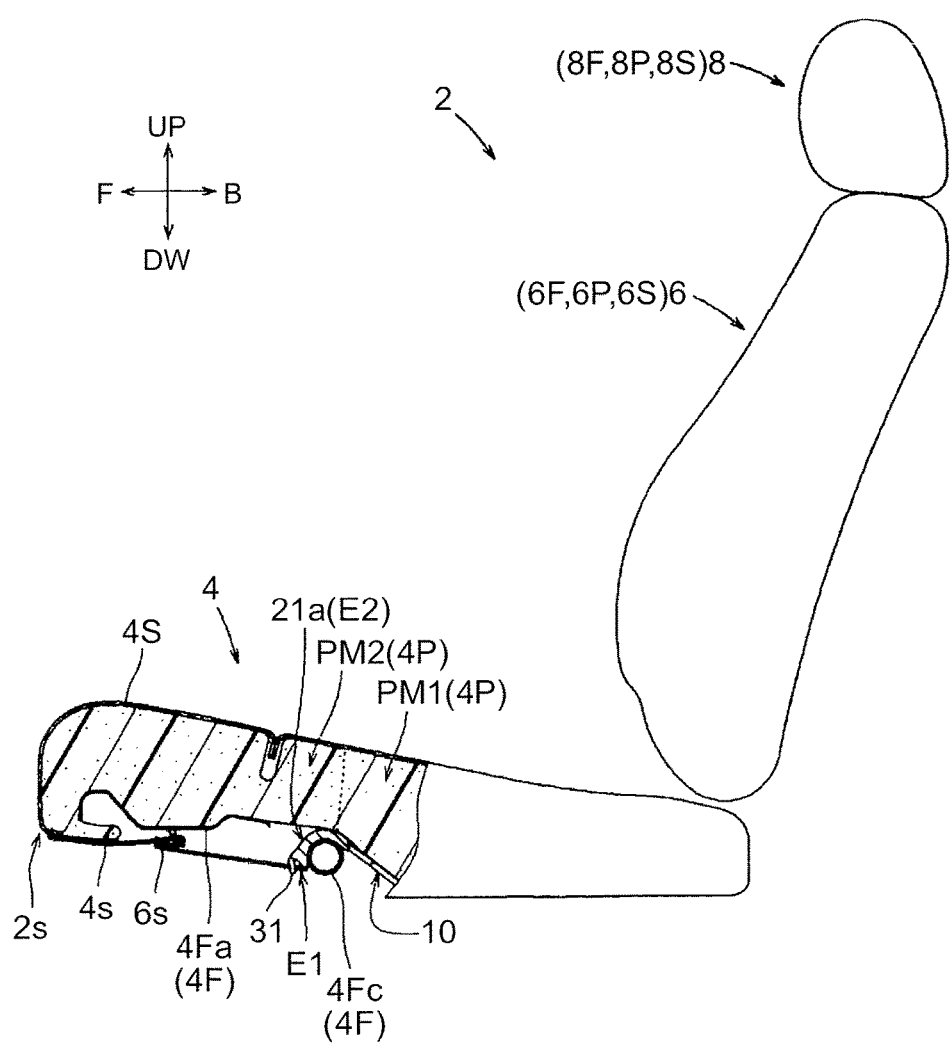
FIG. 1 is a partially perspective side view of a vehicle seat.

Hereinafter, an embodiment of the invention will be described with reference to FIG. 1 to FIG. 7. In the drawings, symbols F, B, UP, DW, R and L are appropriately shown to respectively indicate the front side, rear side, upside, downside, right side and left side with respect to a vehicle seat. A vehicle seat 2 in FIG. 1 includes a seat cushion 4, a seat back 6, and a head rest 8. Each of the seat constituent members includes a seat frame (4F, 6F, 8F) that forms a framework of the seat, a seat pad (4P, 6P, 8P) that forms an external shape of the seat, and a seat cover (4S, 6S, 8S) that covers the seat pad. In this embodiment, a lower part of the seat back 6 is tiltably connected to a rear part of the seat cushion 4, and the head rest 8 is disposed on top of the seat back 6 in a standing position.

Figure 7:
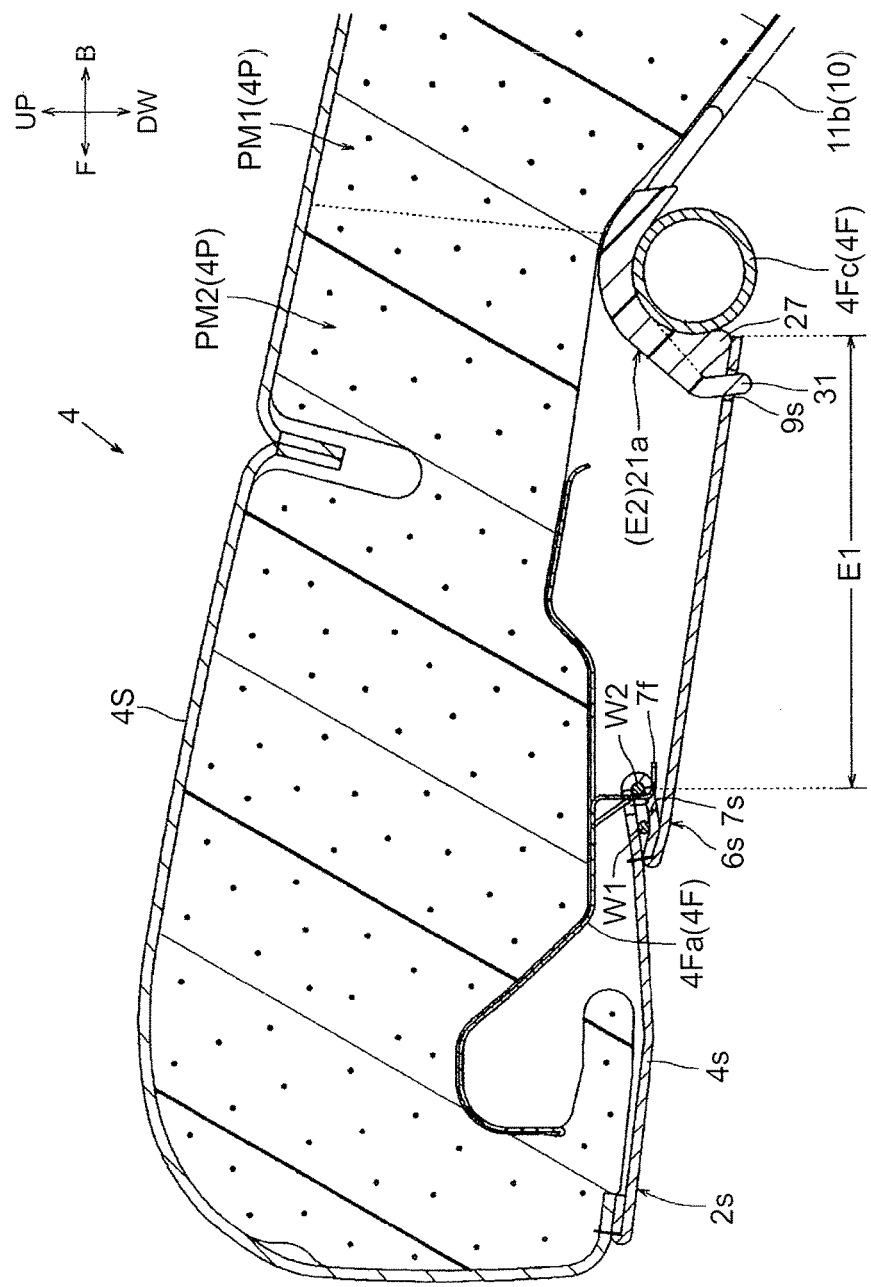
FIG. 7 is a cross-sectional view of a seat cushion.

As shown in FIG. 1 and FIG. 7, the seat cushion 4 includes basic constituent members 4F, 4P and 4S as described above, and a support member 10 (each member will be described in detail later). In this embodiment, as described later, the seat pad 4P is disposed on the seat frame 4F and covered with the seat cover 4S. At this time, a part of the seat pad 4P that extends from an intermediate part to a rear part thereof (a first portion PM1, which is described later) is supported by the support member 10 that is provided within the seat frame 4F, and a front part (a second portion PM2, which is described later) of the seat pad 4P is located in front of the first portion PM1 without being supported by the support member 10. The seat pad 4P is covered with the seat cover 4S such that the seat cover 4S extends from a seating side of the seat pad 4P around to a reverse side of the seat pad 4P. At this time, the reverse side of the seat at the second portion PM2 is covered with the seat cover 4S in view of the appearance and the like of the seat. In the configuration of this kind, it is desirable that a distal portion E1 of the seat cover 4S that is disposed on the reverse side of the seat should be stably retained. Thus, in this embodiment, with a configuration described later, the distal portion E1 of the seat cover 4S is stably retained, the distal portion E1 covering the reverse side of the seat. In the following, each configuration is described in detail.

Figure 2:
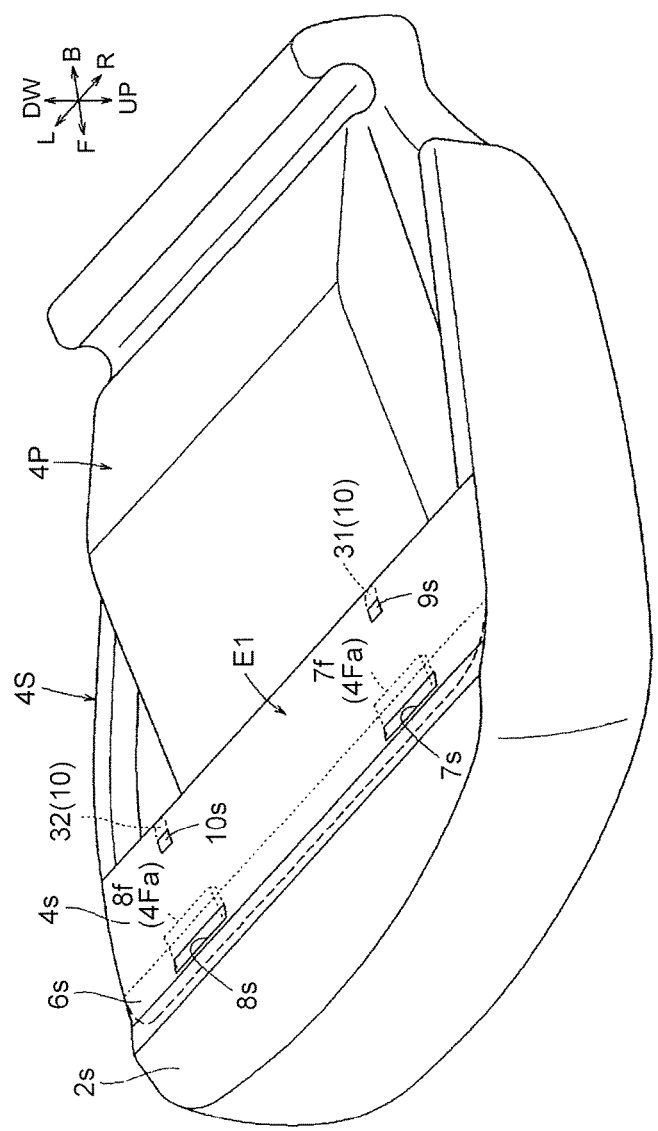
FIG. 2 is a perspective view, viewed from a reverse side, of a seat cover and a seat pad.

As shown in FIG. 2 and FIG. 7, the seat pad 4P forms an external shape of the seat and has a substantially rectangular shape when viewed from above. The seat pad 4P can elastically support an occupant. The material of the seat pad 4P is not specifically limited. For example, the seat pad 4P may be formed of a foamed resin, such as polyurethane foam (density: 10 kg/m$^3$ to 60 kg/m$^3$). The seat pad 4P has a size that can be disposed on the seat frame 4F, which is described later, and has a length in the front-rear direction of the seat that is greater than that of the support member 10, which is also described later. Thus, as described later, the first portion PM1 that is supported by the support member 10, and the second portion PM2 that is not supported by the support member 10 and located in front of the first portion PM1 are provided in the seat pad 4P when the seat pad 4P is disposed on the seat frame 4F.

As shown in FIG. 2 and FIG. 7, the seat cover 4S is a face material that can cover the seat pad 4P, and is provided with a pocket portion 2s that is formed by attaching a carpet member 4s to the seat cover 4S. The material of the seat cover 4S is not specifically limited. For example, the seat cover 4S may be formed of fabric (woven fabric, knitted fabric or non-woven fabric) or leather (natural leather or synthetic leather). The pocket portion 2s is a bag-shaped portion that is provided at a front part of the seat cover 4S, and can be formed by attaching the carpet member 4s having a planar shape to a peripheral edge of a front part of the seat cover 4S by a method such as sewing (stitching). As a material for the carpet member 4s of this kind, any of the materials that are described above as examples of the materials for the seat cover 4S may be used. However, it is preferable that a material having higher bending rigidity than a portion of the seat cover 4S that covers the seating side should be used for the carpet member 4s. For example, a thick non-woven fabric or felt may be appropriately used for the carpet member 4s. In this embodiment, when the seat pad 4P is covered with the seat cover 4S as described later, the carpet member 4s, which forms a part of the seat cover 4S, covers the reverse side of the seat at the second portion PM2. In this state, a rear end part of the carpet member 4s forms the distal portion E1 of the seat cover 4S and is retained by retaining portions, which are described later.

As shown in FIG. 2 and FIG. 7, the pocket portion 2s of this embodiment has a folded portion 6s, a pair of engaging holes 7s and 8s, and a pair of receiving holes 9s and 10s. The folded portion 6s is formed by sewing (stitching) a part of the carpet member 4s that has been folded into a substantially S-shape in its thickness direction, and is formed to extend across the entire carpet member 4s in the seat width direction. The folded portion 6s is formed to be located at an intermediate part of the carpet member 4s in the front-rear direction of the seat when the seat pad 4P is covered with the seat cover 4S, and is formed to extend across the positions where engaging lugs 7f and 8f of a front frame 4Fa, which is described later, are formed. As shown in FIG. 7, a pair of wires W1 and W2 that extends in the seat width direction is inserted into the folded portion 6s. The paired wires W1 and W2 extend in the seat width direction with an appropriate distance therebetween in the seat front-rear direction. The paired engaging holes 7s and 8s are holes that extend through the folded portion 6s in its thickness direction, and are formed between the paired wires W1 and W2. As shown in FIG. 2, the paired engaging holes 7s and 8s are formed with an appropriate distance therebetween in the seat width direction, and each of the paired engaging holes 7s and 8s is located at a position at which it can receive the corresponding one of the engaging lugs 7f and 8f of the seat frame 4F. The paired receiving holes 9s and 10s are holes that extend through the carpet member 4s in its thickness direction, and, as shown in FIG. 2 and FIG. 7, are formed on the distal portion E1 of the seat cover 4S, which is the rear end part of the carpet member 4s relative to the positions where the engaging holes 7s and 8s are engaged with the engaging lugs 7f and 8f, respectively. The paired receiving holes 9s and 10s are formed with an appropriate distance therebetween in the seat width direction, and each of the paired of receiving holes 9s and 10s is located at a position at which it can receive the corresponding one of retaining portions 31 and 32 of the support member 10, which is described later. In this embodiment, as shown in FIG. 2, one engaging hole 7s and one receiving hole 9s are located in the right side of the seat and the other engaging hole 8s and the other receiving hole 10s are located in the left side of the seat when the seat pad 4P is covered with the seat cover 4S.

Figure 3:
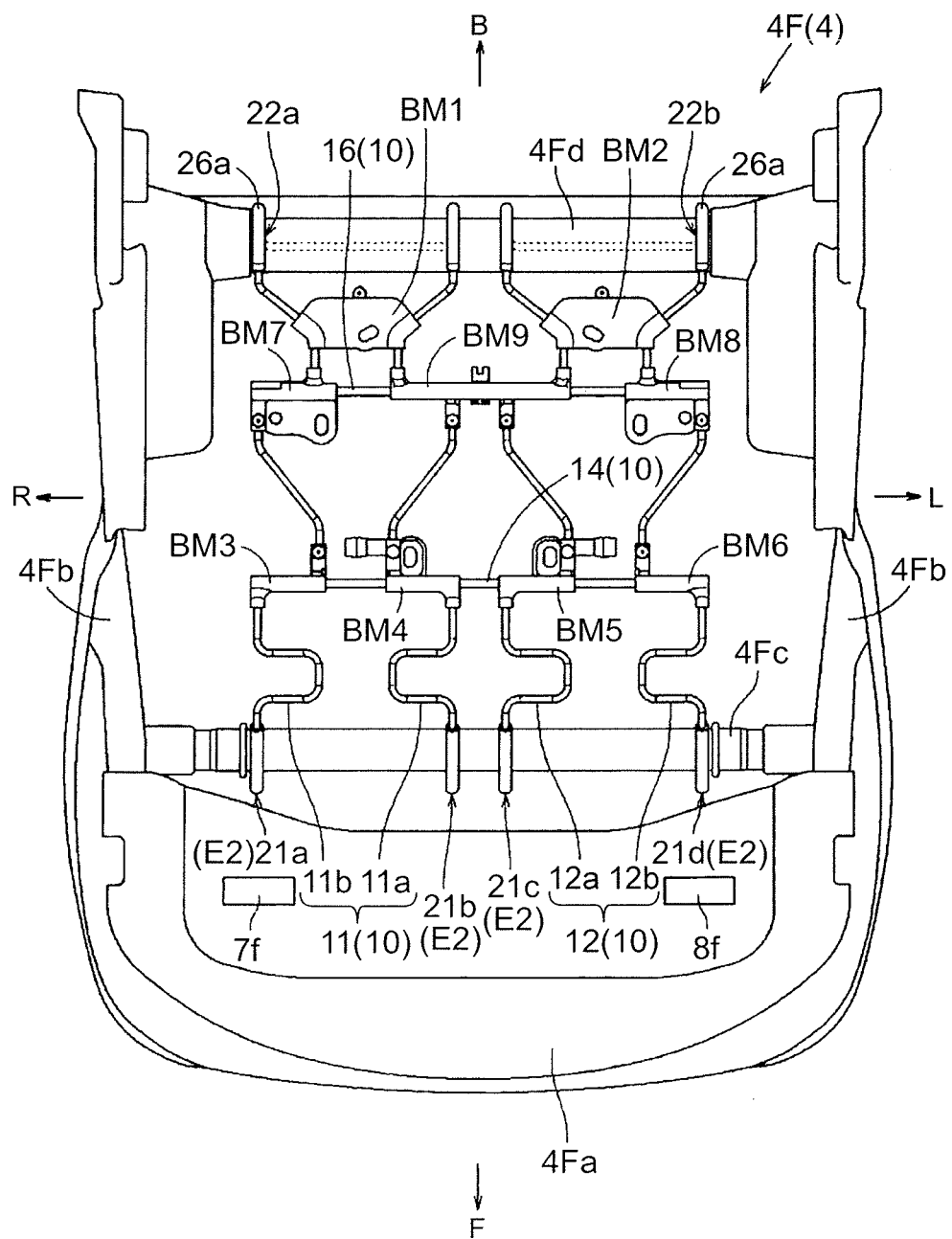
FIG. 3 is a top view of a seat frame and a support member.

The seat frame 4F is typically a substantially rectangular frame body that is made of a metal, and, as shown in FIG. 3, includes the front frame 4Fa, a pair of side frames 4Fb, and a first receiving portion 4Fc and a second receiving portion 4Fd which may be regarded as receiving portions of the invention. The front frame 4Fa is a flat plate-shaped member that forms a front part of the seat frame 4F, and, as shown in FIG. 2 and FIG. 7, includes the paired engaging lugs 7*f* and 8*f* that are engageable with the carpet member 4*s* and are formed with an appropriate distance therebetween in the seat width direction. Each of the paired engaging lugs 7*f* and 8*f* has a substantially L-shape and is formed by cutting and bending a part of the front frame 4Fa. Each of the engaging lugs 7*f* and 8*f* extends downward from a reverse side of the front frame 4Fa and then is bent rearward. One engaging lug 7*f* is formed in the right side of the seat and located at a position at which it can be inserted into one engaging hole 7*s*, and the other engaging lug 8*f* is formed in the left side of the seat and located at a position at which it can be inserted into the other engaging hole 8*s*. The paired side frames 4Fb, each of which is a flat plate-shaped member that forms a lateral part of the seat frame 4F, are respectively disposed in the right and left sides of the seat so as to face each other. The first receiving portion 4Fc, which is a pipe-shaped member elongated in the seat width direction, is located behind the front frame 4Fa to connect the front parts of the paired side frames 4Fb. The second receiving portion 4Fd, which is a pipe-shaped member elongated in the seat width direction connects the rear parts of the paired side frames 4Fb. The first receiving portion 4Fc and the second receiving portion 4Fd are located with an appropriate distance therebetween in the seat front-rear direction, and the support member 10, which is described later, is disposed between the receiving portions 4Fc and 4Fd.

Figure 4:
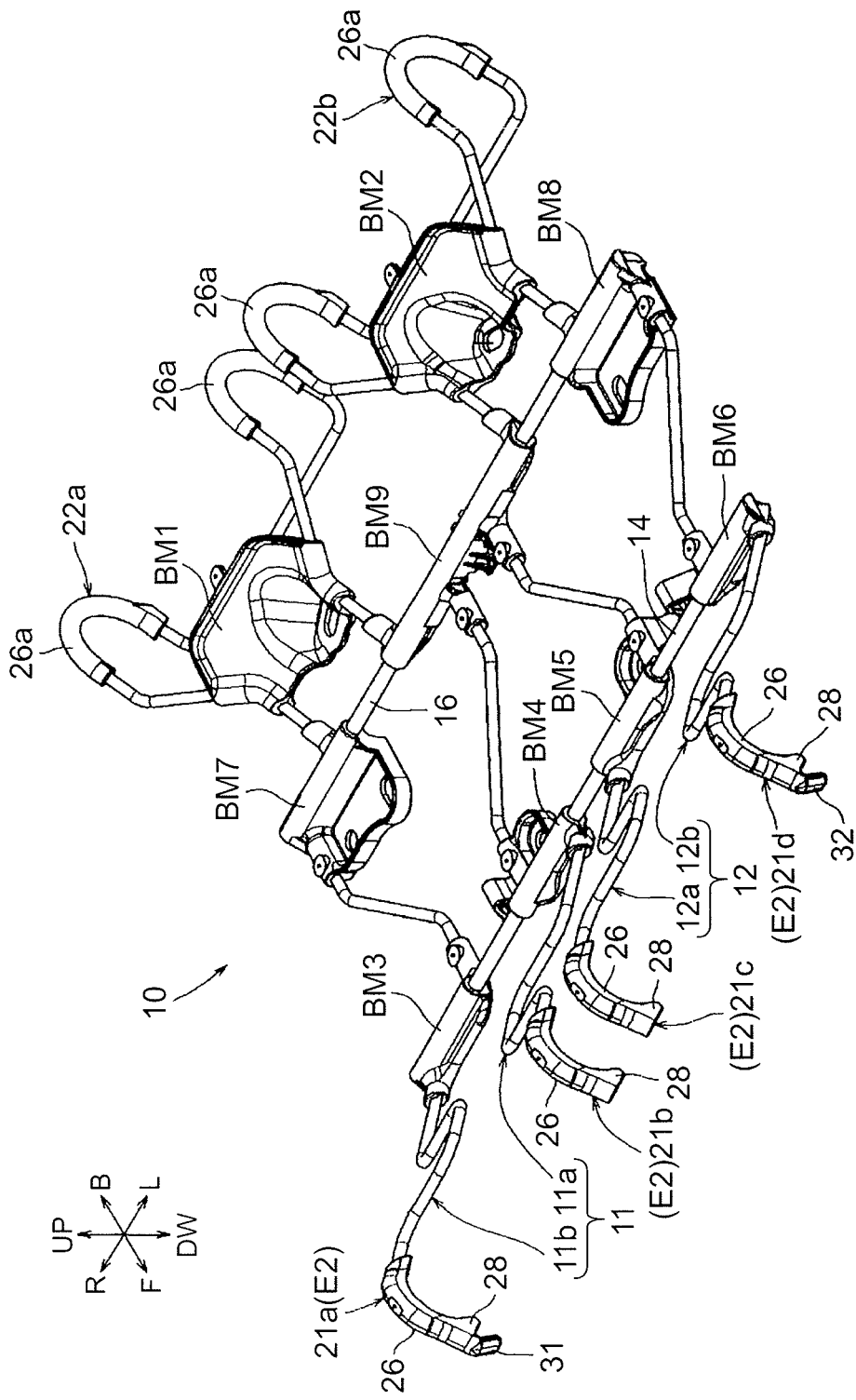
FIG. 4 is a perspective view of the support member.

As shown in FIG. 3 and FIG. 4, the support member 10 is a member formed of a plurality of wire rods that are arranged to form a substantially rectangular shape as viewed from above. The support member 10 can support the seat pad 4P from the reverse side thereof. The support member 10 includes a pair of supporting portions (a first supporting portion 11 and a second supporting portion 12), a pair of connecting portions (a first connecting portion 14 and a second connecting portion 16), a plurality of brackets BM1 to BM9, a plurality of hooking portions 21*a* to 21*d*, 22*a* and 22*b*, and a pair of retaining portions 31 and 32. The support member 10 has a size that can be disposed between the first receiving portion 4Fc and the second receiving portion 4Fd within the seat frame 4F, and has a smaller length in the front-rear direction than the seat pad 4P. Here, each of the supporting portions 11 and 12 and the connecting portions 14 and 16, which form the support member 10, is a linear member that is made of a metal, and each of the brackets BM1 to BM9 is a flat plate-shaped or cylindrical member that is made of a hard resin with appropriate rigidity. Examples of hard resins of this kind include polypropylene resins, polyethylene resins, polyester resins, polyamide resins, polyacetal resins, ABS resins, polycarbonate resins, acrylic resins, styrenic resins and polyvinyl chloride resins.

The first supporting portion 11 is a substantially U-shaped wire rod as viewed from above. The first supporting portion 11 is located in the right side of the seat and has sufficient rigidity to support the seat pad 4P and appropriate flexibility. The first supporting portion 11 includes a pair of arm portions (a first inner arm portion 11*a* and a first outer arm portion 11*b*) that extends toward the front of the seat when the support member 10 is attached to the seat frame 4F. The first inner arm portion 11*a* is appropriately bent in the seat width direction to have a substantially S-shape and is located in the inner side of the seat in the seat width direction (in the left side in the first supporting portion 11). The first outer arm portion 11*b* is appropriately bent in the seat width direction to have a substantially S-shape and is located in the outer side of the seat (in the right side in the first supporting portion 11). The first inner arm portion 11*a* and the first outer arm portion 11*b* are connected to each other at their rear parts by a first bracket BM1 having a substantially rectangular flat plate shape. The second supporting portion 12 is substantially U-shaped wire rod (wire spring) as viewed from above. The second supporting portion 12 is located in the left side of the seat, and includes, as in the case of the first supporting portion 11, a second inner arm portion 12*a* that is located in the right side, a second outer arm portion 12*b* that is located in the left side, and a second bracket BM2 that connects rear parts of the arm portions 12*a* and 12*b*.

In this embodiment, as shown in FIG. 3, the first supporting portion 11 and the second supporting portion 12 are arranged side by side with an appropriate distance therebetween in the seat width direction. In this state, the first connecting portion 14, which is a rod elongated in the seat width direction, is disposed in the front part of the supporting portions 11 and 12, and the portions 11, 12 and 14 are connected by a plurality of front brackets BM3 to BM6. Each of the front brackets BM3 to BM6 is a cylindrical member that is bent in a crank shape as viewed from above. The first connecting portion 14 and the first supporting portion 11 are inserted into and retained by the front brackets BM3 and BM4 in the right side, and the first connecting portion 14 and the second supporting portion 12 are inserted into and retained by the front brackets BM5 and BM6 on the left side.

The second connecting portion 16, which is a rod elongated in the seat width direction, is disposed in the rear part of the supporting portions 11 and 12, and the portions 11, 12 and 16 are connected by a plurality of rear brackets BM7 to BM9. Each of the rear brackets BM7 and BM8 that are located in the right and left sides, respectively, is a cylindrical member that is bent in a crank shape, and the rear bracket BM9 that is located at the center is a linear cylindrical member. The second connecting portion 16 and the first outer arm portion 11*b* are inserted into and retained by the rear bracket BM7 in the right side, and the second connecting portion 16 and the second outer arm portion 12*b* are inserted into and retained by the rear bracket BM8 in the left side. The second connecting portion 16, the first inner arm portion 11*a* and the second inner arm portion 12*a* are respectively inserted into and retained by the rear bracket BM9 at the center.

Figure 5:
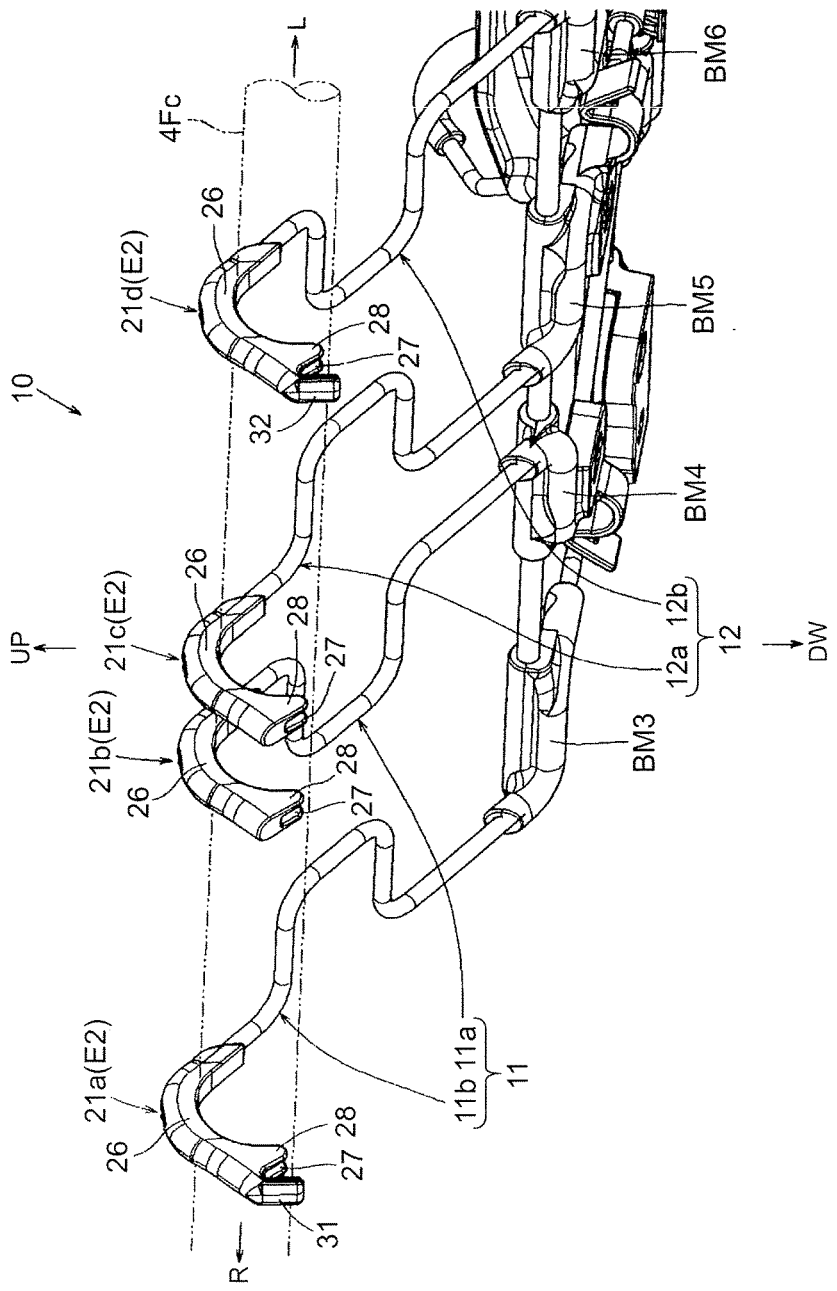
FIG. 5 is a perspective view of a part of the support member.

As shown in FIG. 3, each of the plurality of hooking portions (first hooking portions 21*a* to 21*d* and second hooking portions 22*a* and 22*b*) is a portion that can be hooked over the corresponding one of the receiving portions 4Fc and 4Fd of the seat frame 4F. Each of the first hooking portions 21*a* to 21*d* can be hooked over the first receiving portion 4Fc, and is formed of a front end portion E2 that may be regarded as a second portion-side end of the support member in the invention. In this embodiment, as shown in FIG. 5, each of the first hooking portions 21*a* to 21*d* is formed at a front end of the corresponding one of the arm portions 11*b*, 11*a*, 12*a* and 12*b* so that the first hooking portions 21*a* to 21*d* can be arranged side by side in an alphabetical order from right to left of the seat. Because the plurality of first hooking portions 21*a* to 21*d* have substantially the same basic configuration, the rightmost first hooking portion 21*a* is taken as an example and described in detail below.

Figure 6:
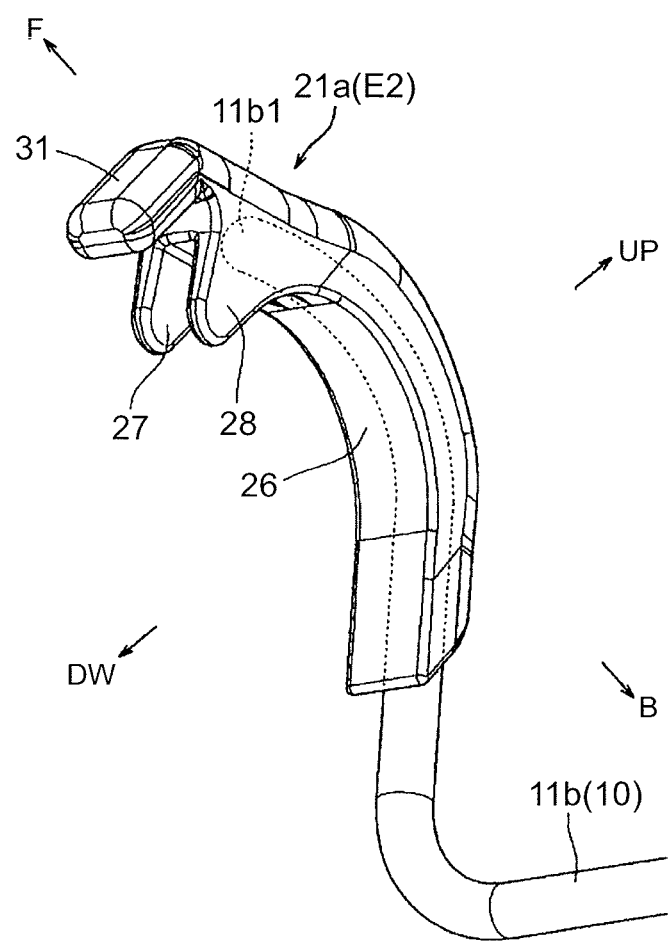
FIG. 6 is an enlarged perspective view of a part of the support member.

As shown in FIG. 5 and FIG. 6, the first hooking portion 21*a* has a substantially semicircular arc shape that protrudes forward, and is formed of a front end of the first outer arm portion 11b and a covering portion 26 that is made of a resin and covers the front end of the first outer arm portion 11b. The resin (the kind of resin) for use in forming the covering portion 26 is not specifically limited but preferably has appropriate strength and slight flexibility. Any of the hard resins that are described above as examples of the material for the brackets may be used. The inner side of the covering portion 26 has a curved shape that allows the first hooking portion 21a to be disposed along the first receiving portion 4Fc. An inner surface of an upper end of the covering portion 26 is substantially flat, whereas a pair of standing wall portions 27 and 28 is provided on an inner surface of a lower end of the covering portion 26. The paired standing wall portions 27 and 28 are flat plate portions that extend from an inner surface of the covering portion 26, and are located with an appropriate distance therebetween in the seat width direction. When the paired standing wall portions 27 and 28 are formed as described above, the contact area between the first hooking portion 21a and the first receiving portion 4Fc is decreased. Thus, when the support member 10 receives a load from the seat pad 4P, the first hooking portion 21a smoothly slides on the first receiving portion 4Fc and the support member 10 is flexurally deformed downward. This configuration contributes to improvement of the supporting performance of the support member 10.

As shown in FIG. 3, each of the second hooking portions 22a and 22b is a portion that can be hooked over the second receiving portion 4Fd, and is formed of a rear end of the support member 10 and a corresponding one of a pair of other covering portions 26a. The second hooking portion 22a at one end is formed by curving a rear end of the first supporting portion 11 downward into a substantially sideways U-shape as viewed from a side. The second hooking portion 22b at the other end is also formed by curving a rear end of the second supporting portion 12 into a substantially sideways U-shape as viewed from a side. Each of the other covering portions 26a is a member that is made of the same material as the material for the above-described covering portions 26 and has a sideways U-shape as viewed from a side. The other covering portions 26a cover the parts of the second hooking portions 22a and 22b that can contact the second receiving portion 4Fd.

As shown in FIG. 5, each of a pair of retaining portions (a first retaining portion 31 and a second retaining portion 32) is a portion provided at a front end portion E2 of the support member 10, and can retain the distal portion E1 of the seat cover 4S as shown in FIG. 2. In this embodiment, the first retaining portion 31 is provided on the first hooking portion 21a of the rightmost first outer arm portion 11b, and is disposed such that the first retaining portion 31 can be inserted into the one receiving hole 9s of the seat cover 4S. The second retaining portion 32 is provided on the first hooking portion 21d of the leftmost second outer arm portion 12b, and is disposed such that the second retaining portion 32 can be inserted into the other receiving hole 10s of the seat cover 4S. Because the paired retaining portions 31 and 32 have substantially the same basic configuration, the first retaining portion 31 is taken as an example and described in detail.

As shown in FIG. 5 and FIG. 6, the first retaining portion 31 is a flat plate-shaped portion that extends (branches) from the standing wall portions 27 and 28 at a lower end of the first hooking portion 21a and protrudes forward (i.e., toward the second portion PM2-side, that is, toward a side where the second portion PM2 (described later) is positioned) in an isolated manner (that is, the first retaining portion 31 is apart from the standing wall portions 27 and 28). The first retaining portion 31 has a solid structure with no void therein, and is configured to be gradually inclined rearward in a direction from a top to a bottom thereof when the support member 10 is attached to the seat frame 4F as shown in FIG. 7. Thus, the first retaining portion 31 has appropriate strength and supporting performance, and can appropriately retain the distal portion E1 of the seat cover 4S under ordinary tension. In addition, as shown in FIG. 6, because an end 11b1 of the first outer arm portion 11b does not extend into the first retaining portion 31, the first retaining portion 31 has a solid structure that is formed of only the covering portion 26 and therefore has slight flexibility. Thus, because an elastic force that is generated when the first retaining portion 31 returns to its original shape from its flexural deformation applies tension to the covering portion 26, improved finishing can be achieved. When the distal portion E1 of the seat cover 4S is excessively pulled forward, the free end of the first retaining portion 31 is able to flexurally deform in a direction away from the first hooking portion 21a (i.e., the free end of the first retaining portion 31 is able to move relative to the first hooking portion 21a) by using the force for pulling the distal portion E1 forward.

As shown in FIG. 3, the support member 10 is disposed within the seat frame 4F such that the support member 10 can support the seat pad 4P from the reverse side thereof. At this time, the first hooking portions 21a to 21d at the front end of the support member 10 are hooked over the first receiving portion 4Fc from the upper front side. The second hooking portions 22a and 22b at the rear end of the support member 10 are hooked over the second receiving portion 4Fd from the upper rear side. In this way, the support member 10 is disposed between the first receiving portion 4Fc and the second receiving portion 4Fd within the seat frame 4F such that the support member 10 can support the seat pad 4P from the reverse side thereof. Although the hooking portions 21a to 21d, 22a and 22b and the receiving portions 4Fc and 4Fd are all made of metal, the hooking portions 21a to 21d, 22a and 22b and the receiving portions 4Fc and 4Fd contact each other via the covering portions 26 and 26a which are made of a resin. This configuration can minimize uncomfortable noise that is caused by the contact between them.

Next, as shown in FIG. 7, the seat pad 4P is disposed on the seat frame 4F via the support member 10 and is covered with the seat cover 4S. At this time, the first portion PM1, which is a part of the seat pad 4P that extends from an intermediate part to a rear part thereof, is supported by the support member 10 from the reverse side thereof. The second portion PM2, which is a front part of the seat pad 4P, is not supported by the support member 10 and disposed on the front frame 4Fa. The second portion PM2 is positioned in front of the first portion PM1. Then, a front part of the seat cover 4S is disposed over the seat pad 4P such that the seat cover 4S extends from the seating side around to the reverse side of the seat pad 4P. At this time, in view of the appearance of the seat, the reverse side of the seat at the second portion PM2 is covered with the seat cover 4S. In this embodiment, the second portion PM2, which is a front part of the seat pad 4P, is inserted into the pocket portion 2s of the seat cover 4S together with the front frame 4Fa, and each of the engaging lugs 7f and 8f is engaged with the corresponding one of the engaging holes 7s and 8s of the pocket portion 2s as shown in FIG. 2. In this way, the reverse side of the seat at the second portion PM2 is covered with the carpet member 4s. In the configuration of this kind, it is desirable that the distal portion E1 of the seat cover 4S that covers the reverse side of the seat pad 4P should be stably retained.

In this embodiment, as shown in FIG. 5, the retaining portions 31 and 32 are respectively provided on the first hooking portions 21a and 21d that are the second portion-side ends (the front end portions E2) of the support member 10. As shown in FIG. 2 and FIG. 7, when the seat pad 4P is covered with the seat cover 4S, the distal portion E1 of the seat cover 4S, which is a rear part of the carpet member 4s, is pulled toward the support member 10 and the retaining portions 31 and 32 are inserted into the corresponding receiving holes 9s and 10s, respectively, of the distal portion E1. This enables the distal portion E1 of the seat cover 4S to be retained stably by the retaining portions 31 and 32 of the support member 10 with the reverse side of the seat covered with the carpet member 4s. At this time, since the retaining portions 31 and 32 are located at the right and left ends of the support member 10, the distal portion E1 of the seat cover 4S can be retained in a balanced manner in the seat width direction. In addition, because each of the retaining portions 31 and 32 protrudes forward in an isolated manner from the standing wall portions 27 and 28 of the corresponding one of the first hooking portions 21a and 21d (in other words, each of the retaining portions 31 and 32 is apart from the standing wall portions 27 and 28 of the corresponding one of the first hooking portions 21a and 21d), the first hooking portions 21a and 21d hardly cause interference with the distal portion E1 of the seat cover 4S when the distal portion E1 is attached to the retaining portions 31 and 32. Further, because each of the retaining portions 31 and 32 is formed of the covering portion 26 that is made of a resin, it is possible to minimize the possibility that peripheral edges around receiving holes 9s and 10s are damaged due to contact with the retaining portions 31 and 32.

In a seat configuration of this kind, the distal portion E1 of the seat cover 4S may be pulled forward when the seat pad 4P is significantly depressed and deformed under a significant load from the seating side. At this time, in this embodiment, there is a concern that when the seat cover 4S is excessively pulled, the supporting performance of the support member 10 may be adversely affected as a result of an unexpected tension being applied thereto. Thus, in this embodiment, each of the retaining portions 31 and 32 is formed of only the covering portion 26 and has slight flexibility. Thus, when the distal portion E1 of the seat cover 4S is excessively pulled forward, the free end of each of the retaining portions 31 and 32 flexurally deforms in a direction away from the corresponding one of the first hooking portions 21a and 21d and moves relative to the corresponding one of the first hooking portions 21a and 21d, by using the force for pulling the distal portion E1 forward. In this way, the forward relative movement of the retaining portions 31 and 32 absorbs an excessive tension on the seat cover 4S and appropriately prevents an excessive tension from being applied to the support member 10.

As described above, in this embodiment, the distal portion E1 of the seat cover 4S can be stably retained using the support member 10 with the reverse side of the seat at the second portion PM2 covered with the seat cover 4S. Also in this embodiment, when the seat cover 4S is excessively pulled, for example, relative movement of the retaining portions 31 and 32 can absorb the tension on the seat cover 4S and appropriately prevent an excessive tension from being applied to the support member 10. In this embodiment, because each of the retaining portions 31 and 32 protrudes from a corresponding one of the second portion-side ends (front end portions E2) of the support member 10, the second portion-side end (the front end portion E2) of the support member 10 hardly causes interference with the distal portion E1 of the seat cover 4S when the distal portion E1 is attached to and retained by the retaining portions 31 and 32. In this embodiment, because each of the retaining portions 31 and 32 is formed of only the covering portion 26 that is made of a resin, it is possible to minimize the possibility that the distal portion E1 of the seat cover 4S is damaged due to contact with the retaining portions 31 and 32. Thus, according to this embodiment, the distal portion E1 of the seat cover 4S that covers the reverse side of the seat can be stably retained.

The vehicle seat of this invention is not limited to the above-described embodiment, and the invention may be implemented in various different forms. While an example of the configuration (shape, size, location, number, and the like) of the retaining portions 31 and 32 is described in the embodiment, the configuration of the retaining portions 31 and 32 is not limited to the configuration in the embodiment. For example, the retaining portion may be formed on at least one of the hooking portions. Each retaining portion may protrude in the seat width direction, instead of protruding toward the second portion-side, from the corresponding hooking portion. Each retaining portion may be formed of the arm portion itself of the support member. As the retaining portion, a face material that is provided on the second portion-side end of the support member may be used. In this case, a distal portion of the seat cover may be retained on the face material serving as the retaining portion by a configuration such as a hook and loop fastener or slide fastener (zipper) or by a method such as sewing (stitching), adhesive bonding or fusion bonding. Holes may be formed in the face material serving as the retaining portion so that the distal portion of the seat cover can be retained by inserting protrusions that are formed on the distal portion of the seat cover into the holes.

While an example of the configuration (shape, size, various constituents, and the like) of the support member 10 is described in this embodiment, the configuration of the support member 10 is not limited to the configuration in the embodiment. For example, the support member may be formed of a flat plate-shaped member instead of a plurality of wire rods or a single wire rod. The end portions of the support member and the receiving portion may be configured in various forms as long as the end portions of the support member can be hooked over the receiving members. For example, substantially L-shaped protrusions that protrude upward or downward may be formed as receiving portions so that substantially J-shaped end portions of the support member can be hooked over the receiving portions from the seat width direction.

While a front part of the seat pad 4P is formed as an example of the second portion PM2 in this embodiment, the second portion may be formed in at least one of a front part, a rear part and a lateral part of the seat pad. The positions where the retaining portions are formed in the support member can be set depending on the position where the second portion is formed. For example, when the second portion is located at a rear part of the seat pad, the retaining portions may be provided on the second hooking portions of the support member. In this case, the seat cover can cover wire rods including cables and wires, and various brackets (other members that are disposed on the reverse side of the second portion), in addition to the seat frame, from the reverse side of the seat when the seat cover is disposed over the reverse side of the seat at the second portion. The engaging holes and the engaging lugs may be omitted from the vehicle seat when necessary.

While a seat cushion is described as an example in this embodiment, the configuration of this embodiment is applicable to various constituent members of a seat, such as a seat back. In addition, the configuration of this embodiment is applicable to seats for any vehicles including motor vehicles, aircrafts and trains.

What is claimed is:

1. A vehicle seat comprising:
a seat frame that forms a framework of the vehicle seat;
a seat pad that forms an external shape of the vehicle seat and elastically supports an occupant;
a seat cover that covers the seat pad; and
a linear or planar support that supports the seat pad from a reverse side of the seat pad, wherein:
an end of the support is hooked over a receiver that is provided within the seat frame with the support being disposed within the seat frame;
a first portion that is supported by the support and a second portion that is not supported by the support are formed in the seat pad disposed on the seat frame, and a reverse side of the vehicle seat at the second portion is covered with the seat cover that extends from a seating side of the seat pad around to the reverse side of the seat pad; and
a distal portion of the seat cover is retained by a retainer that is provided on a second portion-side end of the support, the distal portion covering the reverse side of the vehicle seat at the second portion.

2. The vehicle seat according to claim 1, wherein the retainer is able to move relative to the second portion-side end of the support member in a direction away from the second portion-side end, by using a force for pulling the distal portion of the seat cover toward the seating side.

3. The vehicle seat according to claim 1, wherein the retainer extends from the second portion-side end of the support and protrudes away from a side where the second portion is positioned.

4. The vehicle seat according to claim 1, wherein:
the support includes a face material or a wire rod that is made of a metal and that is able to support the seat pad, and a cover that is made of a resin and covers at least a part of the face material or the wire rod; and
the retainer is formed of only the cover.

* * * * *